United States Patent
Duckworth et al.

(10) Patent No.: US 6,674,296 B1
(45) Date of Patent: Jan. 6, 2004

(54) PROBE CARD MEASUREMENT TOOL

(75) Inventors: Koby L. Duckworth, Buda, TX (US); Marian C. Estrada, Dripping Springs, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 53 days.

(21) Appl. No.: 10/085,549

(22) Filed: Feb. 28, 2002

(51) Int. Cl.$^7$ ............................................... G01R 31/02
(52) U.S. Cl. ...................................... 324/758; 324/762
(58) Field of Search ................................ 324/758, 754, 324/755, 761, 770, 756, 757, 759, 762, 555

(56) References Cited

U.S. PATENT DOCUMENTS

| | | | | |
|---|---|---|---|---|
| 5,410,259 A | * | 4/1995 | Fujihara et al. | 324/758 |
| 5,804,983 A | * | 9/1998 | Nakajima et al. | 324/758 |
| 6,407,568 B1 | * | 6/2002 | Mulligan et al. | 324/761 |
| 6,501,289 B1 | * | 12/2002 | Takekoshi | 324/758 |
| 6,535,004 B2 | * | 3/2003 | Mehta et al. | 324/754 |
| 6,552,559 B2 | * | 4/2003 | Hiromatsu | 324/758 |
| 6,586,956 B2 | * | 7/2003 | Aldaz et al. | 324/758 |
| 2002/0063558 A1 | * | 5/2002 | Takeuchi et al. | 324/158.1 |
| 2003/0025517 A1 | * | 2/2003 | Kiest et al. | 324/758 |

OTHER PUBLICATIONS

Wentworth Laboratories, Inc.; Array Probe Card Product Web Page; http://www.wentworthlabs.com/product/cobra.htm; pp. 1–3; Jun. 2001.
Kulicke & Soffa Industries, Inc.; CobraProbe Advantage for Vertical Probing Web Page; http://www.kns.com/prodserv/pdfs/test/CobraProbe.pdf; pp. 1–4; 2001.

* cited by examiner

Primary Examiner—N. Le
Assistant Examiner—Donald M Lair
(74) Attorney, Agent, or Firm—Timothy M. Honeycutt

(57) ABSTRACT

Various embodiments of a measurement tool are disclosed. In one aspect, a measurement tool is provided that includes a frame that has a first member. A second member is provided that is moveable relative to the first member along a first axis and a second axis. The first and second members have first and second cooperating structures engageable to enable the second member to be moved downward along the second axis to a preselected elevation when the second member is moved to a preselected position along the first axis. The movement of the second member along the first axis is constrained when the second member is moved to the preselected elevation. A meter is coupled to the second member for measuring feature heights. The meter has a contact surface that contacts the feature when the second member is moved to the preselected elevation. The tool provides for non-destructive probe card pin height measurement.

26 Claims, 3 Drawing Sheets

PROBE CARD MEASUREMENT TOOL

BACKGROUND OF THE INVENTION

1. Field of the Invention

This invention relates generally to semiconductor processing, and more particularly to a tool for measuring features on an integrated circuit or probe card.

2. Description of the Related Art

Diagnostics comprise a vital aspect of integrated design and fabrication. Verification of electrical characteristics of integrated circuits is necessary to confirm not only proper circuit design and performance, but also the accuracy and consistency of semiconductor fabrication processes.

Vertical probing represents one commonly used diagnostic technique. The method utilizes a probe card that often consists of a probe head mounted on a plate and a printed circuit board mounted beneath the plate. The probe head includes an array of vertically disposed pins that are sandwiched between plates or die. The pins may be quite small and number in the thousands. One of the die has a plurality of bores through which the pins respectively project. The pins are designed to slide axially in the bores. However, the pins are curved at one end to prevent them from slipping completely out of the bores. The pins are brought into selective contact with the printed circuit board during probe testing of an integrated circuit.

To perform a probe test, the probe card is positioned so that the pin array faces downward and the pins are suspended. An integrated circuit is then moved upward into contact with the pin array and various signals are propagated to and from the integrated circuit via the pins. The pins are forced upward axially when the integrated circuit contacts the pin array. The contact by the integrated circuit inflicts mechanical stresses on the pins in the form of both physical loads and thermal stresses. Like most mechanical structures subjected to mechanical stresses, the pins exhibit wear and deformations over time. Deformed, badly worn or fractured pins can lead to false probe readings and wasted diagnostic efforts.

Thus, it is desirable to check the condition of the probe card pins on a regular basis in order to avoid erroneous diagnostics. Conventional techniques typically involve optical or mechanical measurement of pin height. In many conventional optical methods, the pin array is positioned in the usual sense, that is, facing downward. Optical instruments on the probe machine are then used to observe the pin heights. In other techniques, the probe head is flipped and pins are observed from overhead. Both types of optical methods are generally non-destructive. However, optically measuring the pins introduces errors in both optics focus, and to some extent, operator error. Accurate optical measurement requires not only precise but also consistent focusing of microscope optics. Furthermore, consistent interpretation of observed height by operators is necessary in order to avoid false readings. Obviously, human imprecision can lead to inaccurate measurements. Finally, if probe card is inverted for traditional inspection, the pins may not extend from the bores uniformly across the array, and thus result in erroneous measurements.

In conventional mechanical measurement, an instrument is brought into contact with one or more of the pins to measure height. A risk associated with this technique is damage to the pins. If the instrument exhibits lateral movement during examination of the pins, shearing forces may plastically deform or even fail one or more of the pins.

The present invention is directed to overcoming or reducing the effects of one or more of the foregoing disadvantages.

SUMMARY OF THE INVENTION

In accordance with one aspect of the present invention, a measurement tool is provided that includes a frame that has a first member. A second member is provided that is moveable relative to the first member along a first axis and a second axis. The first and second members have first and second cooperating structures engageable to enable the second member to be moved downward along the second axis to a preselected elevation when the second member is moved to a preselected position along the first axis. The movement of the second member along the first axis is constrained when the second member is moved to the preselected elevation. A meter is coupled to the second member for measuring a height of a feature relative to a reference elevation. The meter has a contact surface that contacts the feature when the second member is moved to the preselected elevation. An upwardly facing surface is positioned substantially at the preselected elevation to enable the second member to be moved into contact with the upwardly facing surface without contacting the feature at which point the meter maybe initially set to the reference elevation.

In accordance with another aspect of the present invention, a measurement tool for measuring a height of features of a probe card is provided. The measurement tool includes a frame adapted to seat over the probe card. The frame has an opening to enable overhead access to the features of the probe card, and a first member with a first cooperating structure. A second member is coupled to the frame and moveable relative the first member along a first axis and a second axis. The second member has a second cooperating structure engageable with the first cooperating structure to enable the second member to be moved downward along the second axis to a preselected elevation when the second member is moved to a preselected position along the first axis. The movement of the second member along the first axis is constrained when the second member is moved to the preselected elevation. A meter is coupled to the second member for measuring a height of a feature relative to a reference elevation. The meter has a contact surface that contacts the feature when the second member is moved to the preselected elevation. A biasing member is provided to bias the second member away from the preselected elevation. An upwardly facing surface is positioned substantially at the preselected elevation to enable the second member to be moved into contact with the upwardly facing surface without contacting the feature at which point the meter may be initially set to the reference elevation.

In accordance with another aspect of the present invention, a measurement tool for measuring a height of a plurality of pins of a probe card is provided. The measure tool includes a frame that is adapted to seat over the probe card. The frame has an opening to enable overhead access to the plurality of pins, and a first member with a first upwardly facing opening. A second member is coupled to the frame and is moveable relative to the first member along a first axis and a second axis. The second member and the opening are sized to enable the second member to be moved downward along the second axis to a preselected elevation when the second member is moved to a preselected position along the first axis. When the second member is moved to the preselected elevation, a portion of the second member is positioned in the opening such that the movement of the second member along the first axis is constrained. A meter is coupled to the second member for measuring a height of the plurality of pins relative to a reference elevation. The meter has a contact surface that contacts the plurality of pins when the second member is moved to the preselected elevation. A biasing member is provided to bias the second member away from the preselected elevation. An upwardly facing surface is positioned substantially at the preselected elevation to enable the second member to be moved into contact with the upwardly facing surface without contacting the feature at which point the meter may be initially set to the reference elevation.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
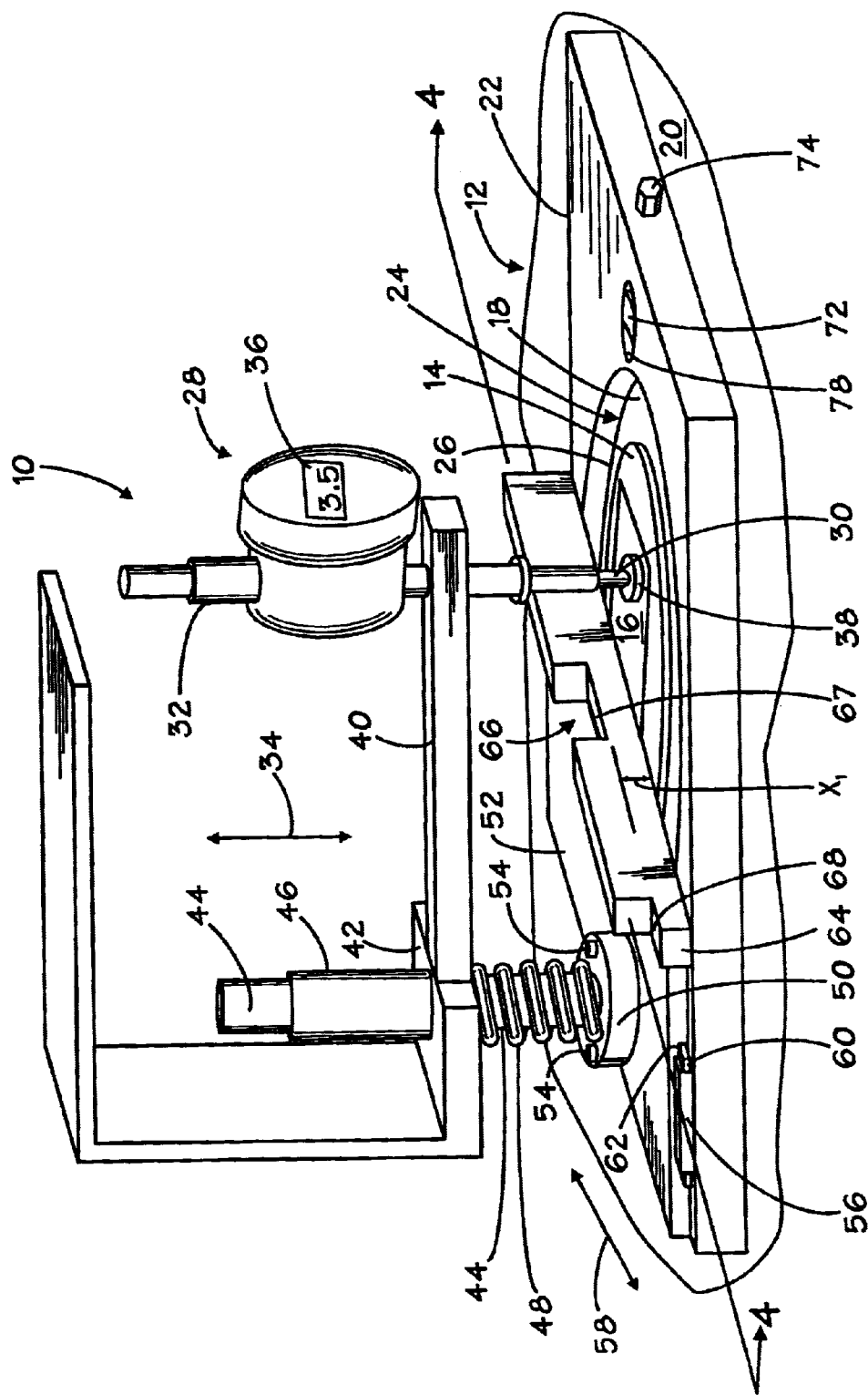
FIG. 1 is a pictorial view of an exemplary embodiment of a measurement tool positioned a probe card in accordance with the present invention.
Figure 2:
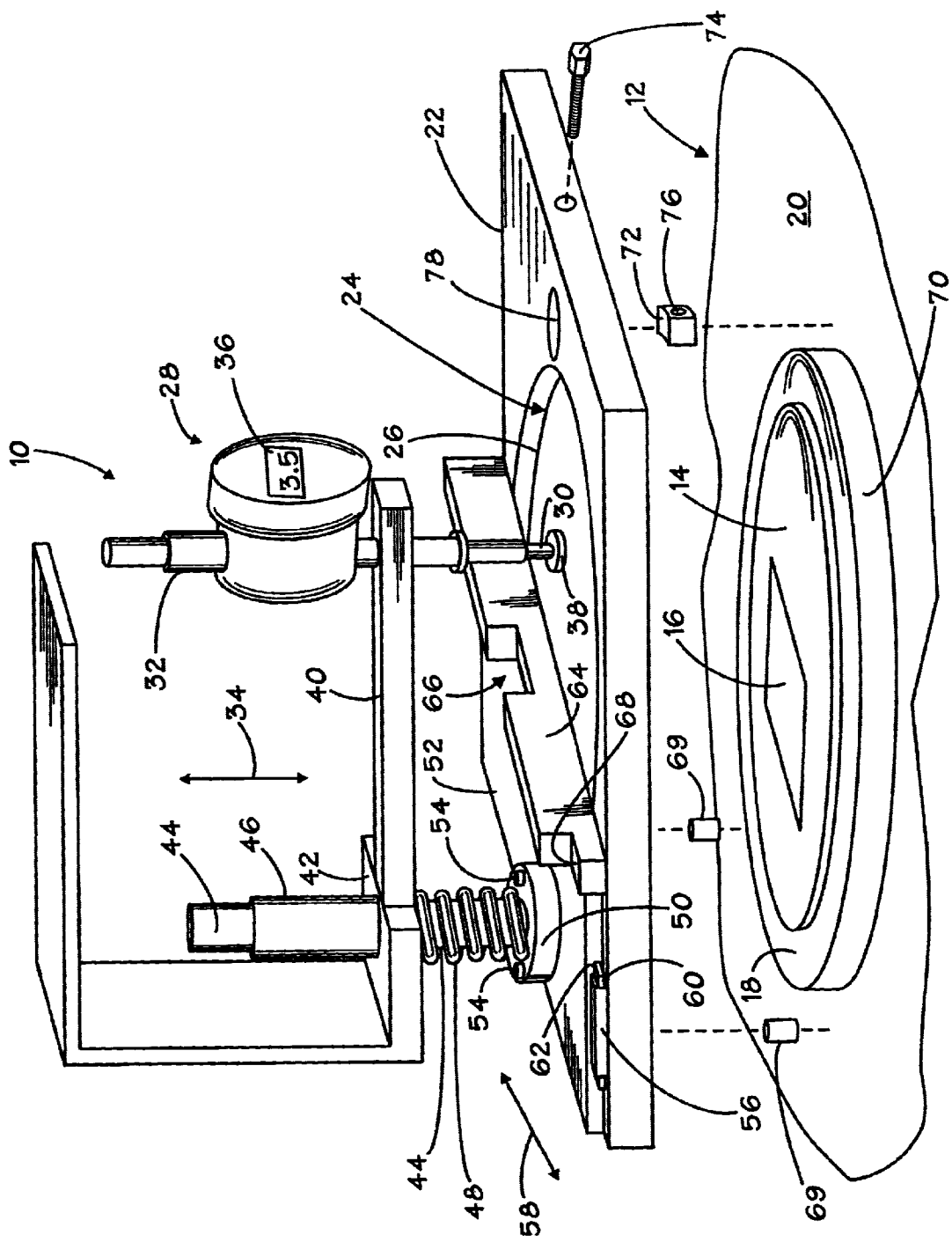
FIG. 2 is a pictorial view like FIG. 1 that shows selected portions of the measurement tool exploded in accordance with the present invention.

In the drawings described below, reference numerals are generally repeated where identical elements appear in more than one figure. Turning now to the drawings, and in particular to FIGS. 1 and 2, therein are shown pictorial views of an exemplary embodiment of a measurement tool 10 in accordance with the present invention. FIG. 2 depicts the measurement tool 10 partially exploded to reveal a few features that are not otherwise visible in FIG. 1. The measurement tool 10 is designed to provide for measurement of selected portions or features of a probe card 12. The exemplary probe card 12 illustrated consists of a disk-like probe head 14 upon or within which a probe array 16 is fabricated The array 16 consists of scores of small upwardly projecting pins. The pins will be illustrated in another figure. The probe head 14 is surrounded by a circular mounting ring 18 that is, in-turn, mounted on a substrate or printed circuit board 20. The printed circuit board 20 is designed to provide a relatively stiff upper supporting surface for the probe head 14 and the mounting ring 18 and circuitry for connecting to the probe array 16.

The measurement tool 10 includes a base 22 that is provided with a centrally located opening 24 that has an internal diameter that is slightly smaller than the outer diameter of the mounting ring 18. In this way, the lower annular rim 26 of the opening 24 is seated on the upper surface of the mounting ring 18 and overhead access is provided to the probe head 14 when the base 22 is seated on the printed circuit board 20. The heights of portions of the pin array 16 may be measured by a meter 28. The meter 28 includes a mandrel 30 that is telescopically positioned inside of a cylindrical housing 32 that is of sufficient length to enable the mandrel 30 to move telescopically along an axis 34. The indicator 28 includes a visible display 36 that provides a readout of the vertical position of the mandrel 30. A contact pad 38 is coupled to the lower end of the mandrel 30. The contact pad 38 is designed to contact the pins of the pin array 16 or other structures of the probe card 12 as described more fully below.

The cylindrical housing 32 of the meter 28 is coupled to a horizontal member 40. The distal end 42 of the member 40 is journalled about a vertically disposed shaft 44 by means of a bearing assembly 46. The bearing assembly 46 enables the horizontal member 40 to translate along the shaft 44 along the axis 34. In this way, the member 40 may be moved to bring the pad 38 of the indicator 28 into contact with the pin array 16 as described more fully below. The member 40 is normally biased upwardly by way of a biasing member or spring 48 that is positioned around the shaft 44 beneath the member 40. The biasing member 48 may be a coil spring as shown or any of a variety of well-known types of springs.

The lower end of the shaft 44 terminates in a flange 50 that is connected to a movable member or trolley 52. The flange 50 is connected to the trolley 52 by way of bolts 54, welding or other well-known fastening techniques. The trolley 52 is slidedly mounted over an axial rail or tongue 56 that is, in-turn, mounted on the base 22. The purpose of the rail 56 is to enable the trolley 52 to slide axially back and forth on the base 22 along an axis 58 without lateral movement, that is, movement perpendicular or oblique to the axis 58. The trolley is designed to enable the indicator 28, and the contact pad 38 thereof to be readily moved axially along the axis 58 to position the contact pad 38 over selected portions of the pin array 16. The trolley 52 is retained on the tongue 56 by laterally projecting ridges 60 that engage corresponding slots 62 formed in the trolley 52. For simplicity of illustration only one of the tongues 60 and one of the grooves 62 are called out and numbered. The cooperating trolley 52 and rail 56 enable the member 40 to be freely moved along the axis 58 so that the contact pad 38 of the indicator 28 may be positioned at a desired portion of the pin array 16.

The shaft 44, bearing assembly 46 and biasing member 48 enable the member 40 to be depressed to bring the contact pad 38 into contact with the pin array 16. However, it is desirable to restrict the movement of the member 40 along the axis 34 that would otherwise bring the contact pad 38 into engagement with the array 16 to only selected positions along the axis 58. If the member 40 and the contact pad 38 were allowed to be depressed and brought into engagement with the pin array 16 at any given position, there is the possibility that the trolley 52 could be moved laterally while the contact pad 38 is in contact with the pin array 16 and thus result in a shearing deformation of components of the pin array 16. In order to restrict the movement of the member 40 along the axis 34 to a specified location or locations along the axis 58, a cross member 64 is secured to the base 22. The cross member 64 and the member 40 have cooperating structures that are engageable to enable the member 40 to be moved downward along the axis 34 to a preselected elevation when the member 40 is moved to a preselected position along the axis 58. The movement of the member 40 along the axis 58 is constrained when the member 40 is moved to the preselected elevation. In this illustrative embodiment, the member 64 is provided with a cooperating structure or slot 66 that has a bottom surface 67 that is positioned at a preselected elevation $X_1$. The elevation $X_1$ is preselected to be a height suitable to enable the contact pad 38 to contact the pin array 16 when the member 40 is bottomed out on the bottom surface 67. The slot 66 will have a width that is at least as large as the width of the member 40 so that the member 40 can easily seat therein. However, the width of the slot 66 should not be so large as to allow excessive play which might otherwise lead to lateral sliding of the contact pad 38 on the pin array 16 and potential damage thereof.

The measurement tool 10 is provided with an upwardly facing reference surface 68 that is also positioned at the preselected elevation $X_1$. The reference surface 68 is positioned away from the opening 24 so that the member 40 may be seated on the reference surface 68 while the contact pad 38 of the meter 28 touche s a non-critical area of the tool 10, such as the b base 22. In this illustrative embodiment, the reference surface 68 is formed in the member 64. However, the skilled artisan will appreciate that the surface 68 may be positioned at a myriad of locations. For example, the flange 50 may be fabricated with an upper surface positioned at $X_1$ and thus function as the reference surface 68. The purpose of the reference surface 68 is to provide a spot where the member 40 may be moved to the preselected elevation $X_1$ and the meter 28 set to zero. In this way the meter 28 may be set to a reference elevation, which will normally, though not necessarily, be zero, prior to taking a measurement of the pin array 16. The preselected elevation $X_1$ is measured from the bottom of the member 64. However, the elevation $X_1$ may be measured from any point in space so long as both the slot surface 67 and the reference 68 are positioned at $X_1$.

The base 22 is provided with structures that align the measurement tool 10 with the mounting ring 18. Pins or pegs 69 are designed to engage the outer peripheral surface 70 of the mounting ring 18 as illustrated in FIG. 2. When the base 22 is seated on the mounting ring 18, a snug engagement to the mounting ring 18 is provided by tightening a wedge or cam 72 that is positioned beneath the upper surface of and secured to the base 22 by means of a bolt 74. The cam 72 is provided with a bore 76 that is threaded to receive the bolt 74. The upper surface of the cam 72 is visible by way of a window 78 formed in the base 22. The base 22 is seated on the mounting ring 18 and brought into a snug engagement therewith by turning the bolt 26 to bring the cam 72 into engagement with the outer peripheral surface 70 of the mounting ring 18. This action draws the pins 69 into snug engagement with the outer peripheral surface 70 as well.

Figure 3:
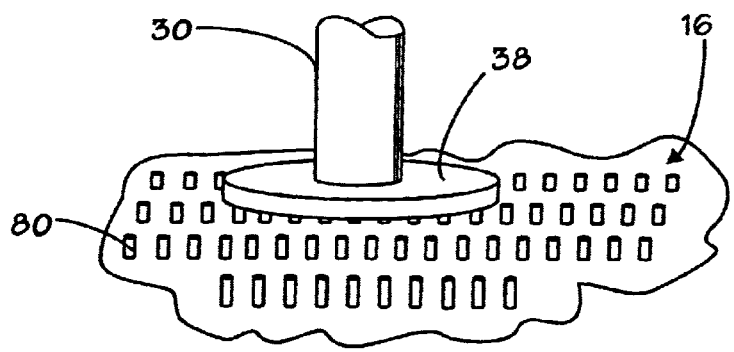
FIG. 3 is a magnified pictorial view of a portion of the measurement tool shown in FIGS. 1 and 2 in accordance with the present invention.

The operation of the measurement tool 10 will now be described in conjunction with FIGS. 1 and 3. FIG. 3 is a magnified pictorial view of a portion of the mandrel 30, the contact pad and the pin array 16. Initially, the base 22 is mounted on the mounting ring 18 as previously described. Thereafter, the trolley 52 is moved laterally as necessary to align the member 40 with the slot 66. At this point, the member 40 is depressed to bring the contact pad 38 into engagement with the pins 80 (see FIG. 3) of the pin array 16. In order to determine the height of a group of pins 80 positioned beneath the contact pad 38, it is necessary to first zero out the indicator 28. This is accomplished by first positioning the member 40 over the reference surface 68 and then moving the member 40 until it seats on the reference surface 68. At this point the contact pad 38 will likely contact the base 22 and the mandrel 30 will move to some axial position. At this point the read out of the indicator 28 is set to a reference elevation, which will normally be zero.

With the meter 28 zeroed out, the measurement tool 10 is now ready to perform a height measurement on a selection of the pins 80. The trolley 52 is moved laterally to position the member 40 over the slot 66 and the member 40 is depressed to bring the contact pad 38 into contact with a portion of the pin array 16 as shown in FIG. 3. At this point, a height of the group of pins 80 is measured by the meter 28.

The contact pad 38 is generally larger in diameter than a given pin 80. Thus, the contact pad 38 is measuring an average height of some plurality of pins 80, with the number of pins sampled depending on the size of the contact pad 38, and the size and spacing of the pins 80. In order to minimize the risk of dam aging the pins 80, the contact pad 38 is selected to be large enough and the force applied by the mandrel 30 is selected to small enough to avoid plastically deforming the pins 80.

Figure 4:
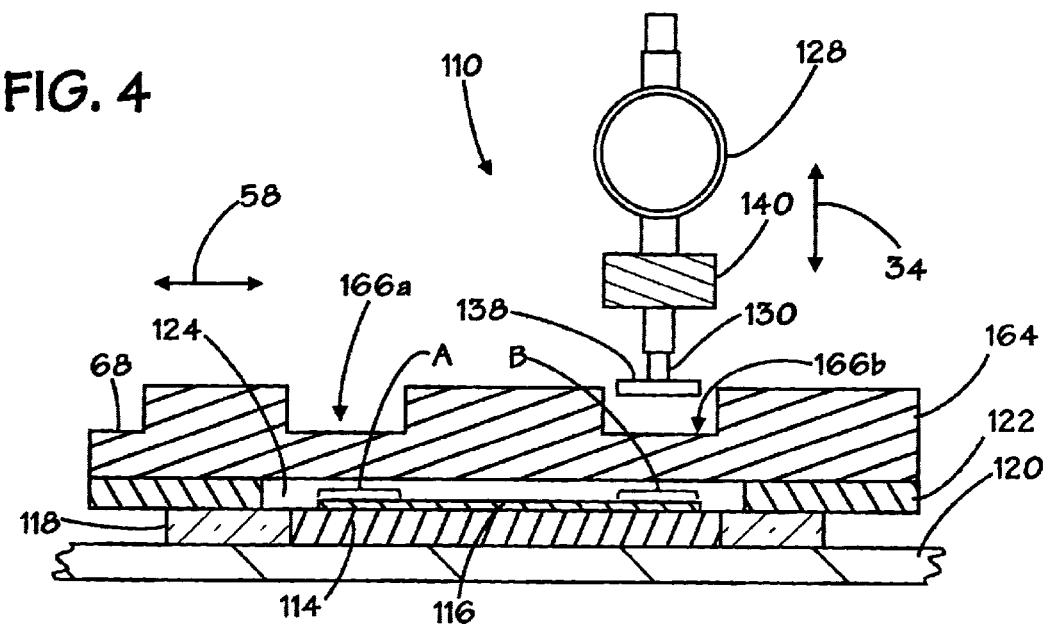
FIG. 4 is a cross-sectional view of an alternate exemplary embodiment of a measurement tool in accordance with the present invention.

In the foregoing illustrative embodiment, the cooperating structures for providing restricted vertical and lateral movement of the member 40 consist of the member 40 itself and a cross member 64 that has a single slot 66 formed therein to accommodate the member 40. However, this arrangement represents just one of a myriad of different types of structural arrangements that can provide for the selective vertical movement of the member 40 and thus the contact pad 38. FIG. 4 illustrates a cross-sectional view of an alternate exemplary embodiment of the measurement tool 110 positioned over a probe card 112 with a probe head 114, a pin array 116, a mounting ring 118 and a printed circuit board 120. FIG. 4 is a cross-sectional view taken at a section equivalent to section 4—4 of FIG. 1, albeit with somewhat different structural features than those depicted in FIG. 1. Like the other illustrative embodiments disclosed elsewhere herein, this illustrative embodiment includes a frame 122 with an opening 124 permitting access to the probe head 114 and a meter 128 with a telescopically movable mandrel 130 and a contact pad 138. The meter 128 is coupled to a member 140 that may be configured as described elsewhere herein. The member 140 is moveable along the axis 58 as describe elsewhere herein. However, a cross member 164 is provided with two slots 166a and 166b that are designed to permit selective movement of the member 140 along the axis 34 at two positions along the axis 58. In this way, the contact pad 138 maybe brought into contact with selected portions A and B of the pin array 116. This arrangement with multiple cooperating structures, i.e., slots 166a and 166b and the member 140, provides for sampling multiple portions of the probe card 112 with constraints on the lateral movement of the member 140 and contact pad 138 during sampling. A reference surface 68 of the type described elsewhere herein should also be provided.

Figure 5:
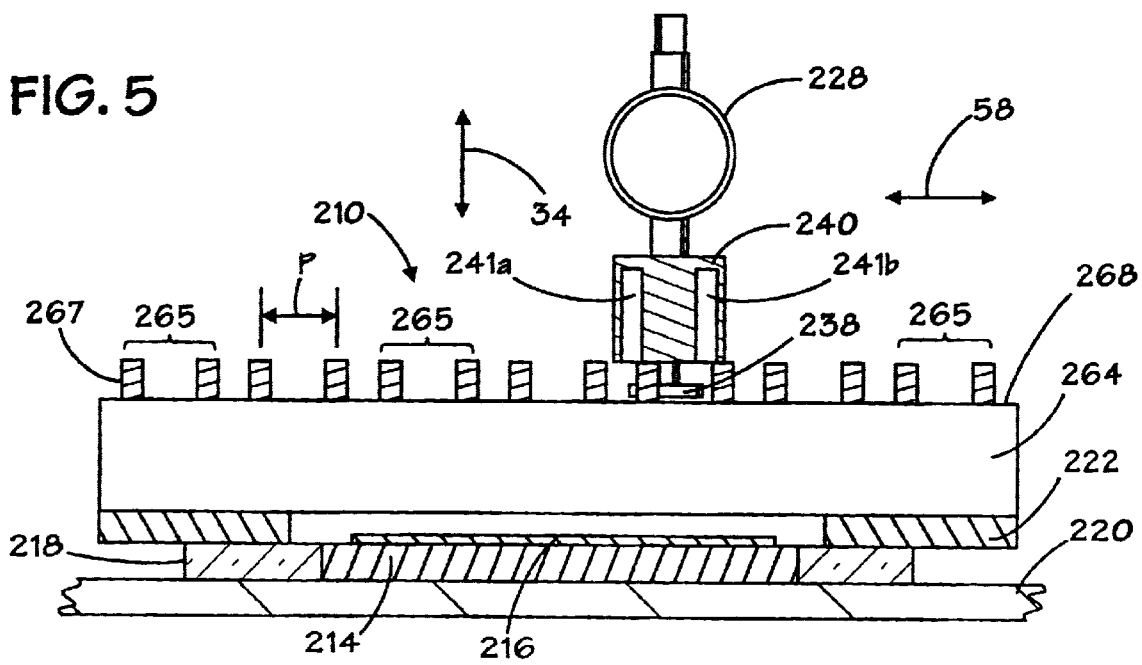
FIG. 5 is a cross-sectional view of another alternate exemplary embodiment of a measurement tool in accordance with the present invention.

Another alternate exemplary embodiment of the measurement tool 210 in accordance with the present invention may be understood by referring now to FIG. 5, which is a cross-sectional view of the measurement tool 210 positioned over a probe card 212 with a probe head 214, a pin array 216, a mounting ring 218 and a printed circuit board 220, and taken from the same general section as FIG. 4. Like the other illustrative embodiments disclosed elsewhere herein, this illustrative embodiment includes a frame 222 with an opening 224 permitting access to the probe head 214 and a meter 228 with a telescopically moveable mandrel 230 and a contact pad 238. The meter 228 is coupled to a member 240 that is configured with one or more openings or slots 241a and 241b. The member 240 is moveable along the axis 58 as describe elsewhere herein. In this illustrative embodiment, a cross member 264 is provided with a plurality of pairs 265 of upwardly projecting members 267. Optionally, a single member 267 could be provided. The members 267 of a given pair 265 are sized to be easily inserted into the openings 241a and 241 when the member 240 is moved along the axis 58 until the openings 241a and 241b are aligned with the members 267. The pitch P between the members 267 of a given pair 265 is selected to correspond to the spacing of the slots 241a and 241b in the member 240. The spacing between adjacent pairs 265 is smaller than the pitch P between the slots 241a and 241b so that the member 240 may only drop down on a given pair 265 and not in between two adjacent pairs 265. In this way, the member 240 maybe dropped down along the axis 34 to a preselected elevation to bring the contact pad 238 into contact with the pin array 216 at a plurality of different positions. However, once dropped down, the movement of the member 240 along the axis 58 is constrained to prevent the contact pad 238 from dragging across the array 216. Note that upper surface 268 of the member 264 may serve as a reference surface for zeroing out the meter 228.

The skilled artisan will appreciate that the present invention provides for rapid, non-destructive measurement of probe card features. The frame 22 may be quickly seated on a probe card and a pin height measurement made by sliding the trolley 52 to an appropriate position to zero out the meter 28 and thereafter moving the trolley 52 laterally until cooperating structures on the member 40 and the member 64 are aligned. The member 40 may then be lowered to make a non-destructive measurement without risk of shearing movement.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A measurement tool, comprising:
   a frame having a first member;
   a second member being moveable relative to the first member along a first axis and a second axis, the first and second members having first and second cooperating structures engageable to enable the second member to be moved downward along the second axis to a preselected elevation when the second member is moved to a preselected position along the first axis, the movement of the second member along the first axis being constrained when the second member is moved to the preselected elevation;
   a meter coupled to the second member for measuring a height of a feature relative to a reference elevation, the meter having a contact surface that contacts the feature when the second member is moved to the preselected elevation; and
   an upwardly facing surface positioned substantially at the preselected elevation to enable the second member to be moved into contact with the upwardly facing surface without contacting the feature at which point the meter may be initially set to the reference elevation.

2. The measurement tool of claim 1, wherein the first cooperating structure comprises a slot and the second cooperating structure comprises the second member.

3. The measurement tool of claim 1, wherein the first cooperating structure comprises a plurality of slots and the second cooperating structure comprises the second member enabling the second member to be moved downward along the second axis to a preselected elevation when the second member is moved to each of a plurality of preselected positions along the first axis.

4. The measurement tool of claim 1, wherein the first cooperating structure comprises an upwardly projecting member and the second cooperating structure comprises a slot.

5. The measurement tool of claim 1, wherein the frame comprises an opening to enable the contact surface to contact the feature.

6. The measurement tool of claim of 5, wherein the feature comprises a pin array.

7. The measurement tool of claim 1, wherein the frame comprises a third member slidably coupled to the frame, the second member being coupled to the third member.

8. The measurement tool of claim 7, wherein the third member comprises a biasing member to bias the second member away from the preselected elevation.

9. The measurement tool of claim 1, wherein the first axis is substantially perpendicular to the second axis.

10. The measurement tool of claim 1, wherein the upwardly facing reference surface comprises an upwardly facing surface of the first member.

11. A measurement tool for measuring a height of features of a probe card, comprising:
    a frame adapted to seat over the probe card and having an opening to enable overhead access to the features of the probe card, the frame having a first member with a first cooperating structure;
    a second member coupled to the frame and being moveable relative to the first member along a first axis and a second axis and having a second cooperating structure engageable with the first cooperating structure to enable the second member to be moved downward along the second axis to a preselected elevation when the second member is moved to a preselected position along the first axis, the movement of the second member along the first axis being constrained when the second member is moved to the preselected elevation;
    a meter coupled to the second member for measuring a height of a feature relative to a reference elevation, the meter having a contact surface that contacts the feature when the second member is moved to the preselected elevation;
    a biasing member to bias the second member away from the preselected elevation; and
    an upwardly facing surface positioned substantially at the preselected elevation to enable the second member to be moved into contact with the upwardly facing surface without contacting the feature at which point the meter may be initially set to the reference elevation.

12. The measurement tool of claim 11, wherein the first cooperating structure comprises a slot and the second cooperating structure comprises the second member.

13. The measurement tool of claim 11, wherein the first cooperating structure comprises a plurality of slots and the second cooperating structure comprises the second member enabling the the second member to be moved downward along the second axis to a preselected elevation when the second member is moved to each of a plurality of preselected positions along the first axis.

14. The measurement tool of claim 11, wherein the first cooperating structure comprises an upwardly projecting member and the second cooperating structure comprises a slot.

15. The measurement tool of claim 11, wherein the frame comprises a third member slidably coupled to the frame, the second member being coupled to the third member.

16. The measurement tool of claim 15, wherein the frame comprises a tongue, the third member comprising a groove positioned around the tongue.

17. The measurement tool of claim 11, wherein the first axis is substantially perpendicular to the second axis.

18. The measurement tool of claim 11, wherein the frame comprises a shaft, the second member being journalled about and moveable along the shaft.

19. The measurement tool of claim 11, wherein the upwardly facing surface comprises an upwardly facing surface of the first member.

20. A measurement tool for measuring a height of a plurality of pins a probe card, comprising:

a frame adapted to seat over the probe card and having an opening to enable overhead access to the plurality of pins, the frame having a first member with a first upwardly facing opening;

a second member coupled to the frame and being moveable relative to the first member along a first axis and a second axis, the second member and the opening being sized to enable the second member to be moved downward along the second axis to a preselected elevation when the second member is moved to a preselected position along the first axis, a portion of the second member being positioned in the opening such that the movement of the second member along the first axis being constrained when the second member is moved to the preselected elevation;

a meter coupled to the second member for measuring a height of the plurality of pins relevative to a reference elevation, the meter having a contact surface that contacts the plurality of pins when the second member is moved to the preselected elevation;

a biasing member to bias the second member away from the preselected elevation; and an upwardly facing surface positioned substantially at the preselected elevation to enable the second member to be moved into contact with the upwardly facing surface without contacting the feature at which point the meter may be initially set to the reference elevation.

21. The measurement tool of claim 20, wherein the first member comprises comprises a plurality of openings enabling the second member to be moved downward along the second axis to a preselected elevation when the second member is moved to each of a plurality of preselected positions along the first axis.

22. The measurement tool of claim 20, wherein the frame comprises a third member slidably coupled to the frame, the second member being coupled to the third member.

23. The measurement tool of claim 22, wherein the frame comprises a tongue, the third member comprising a groove positioned around the tongue.

24. The measurement tool of claim 20, wherein the first axis is substantially perpendicular to the second axis.

25. The measurement tool of claim 20, wherein the frame comprises a shaft, the second member being journalled about and moveable along the shaft.

26. The measurement tool of claim 20, wherein the upwardly facing surface comprises an upwardly facing surface of the first member.

* * * * *